UNITED STATES PATENT OFFICE.

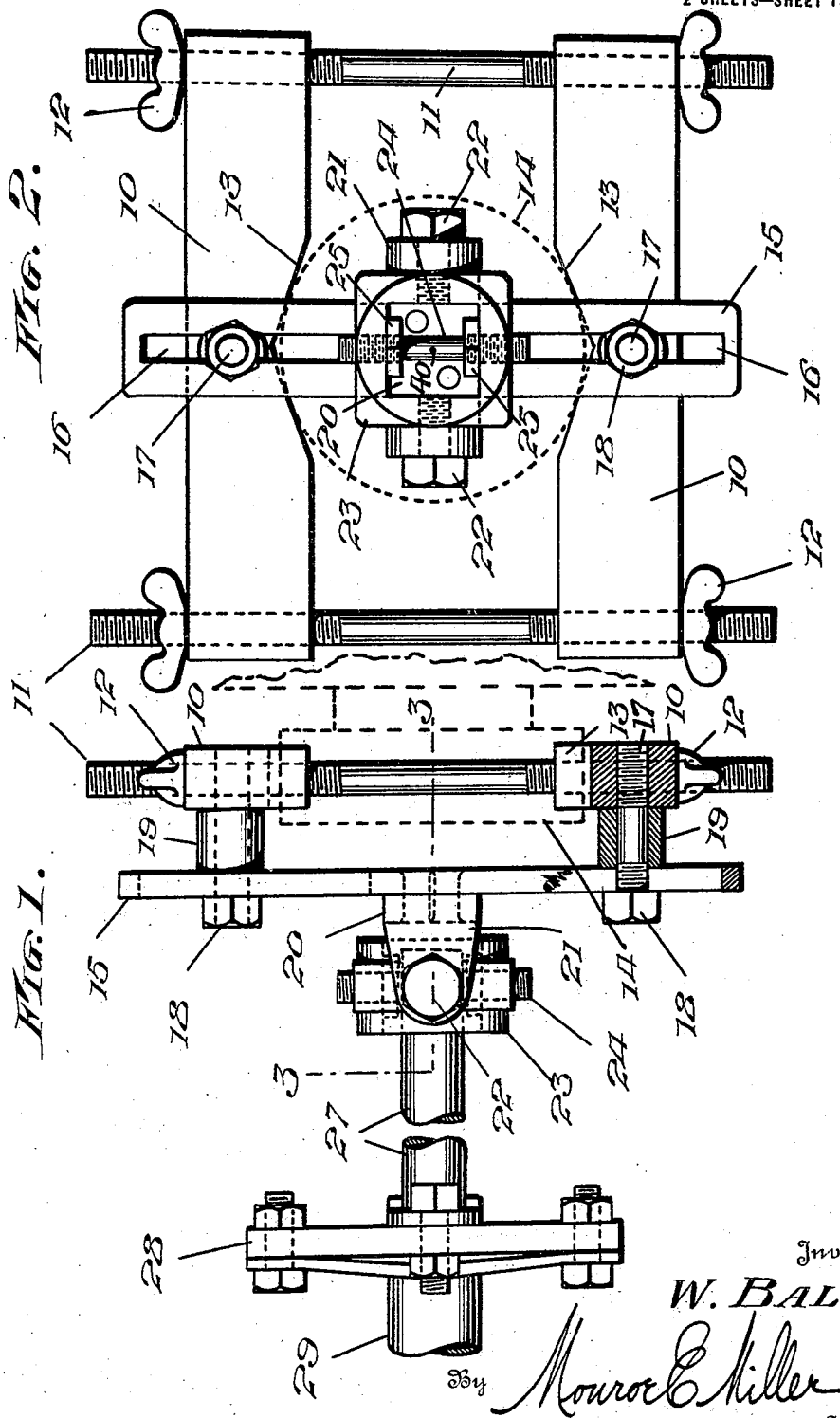

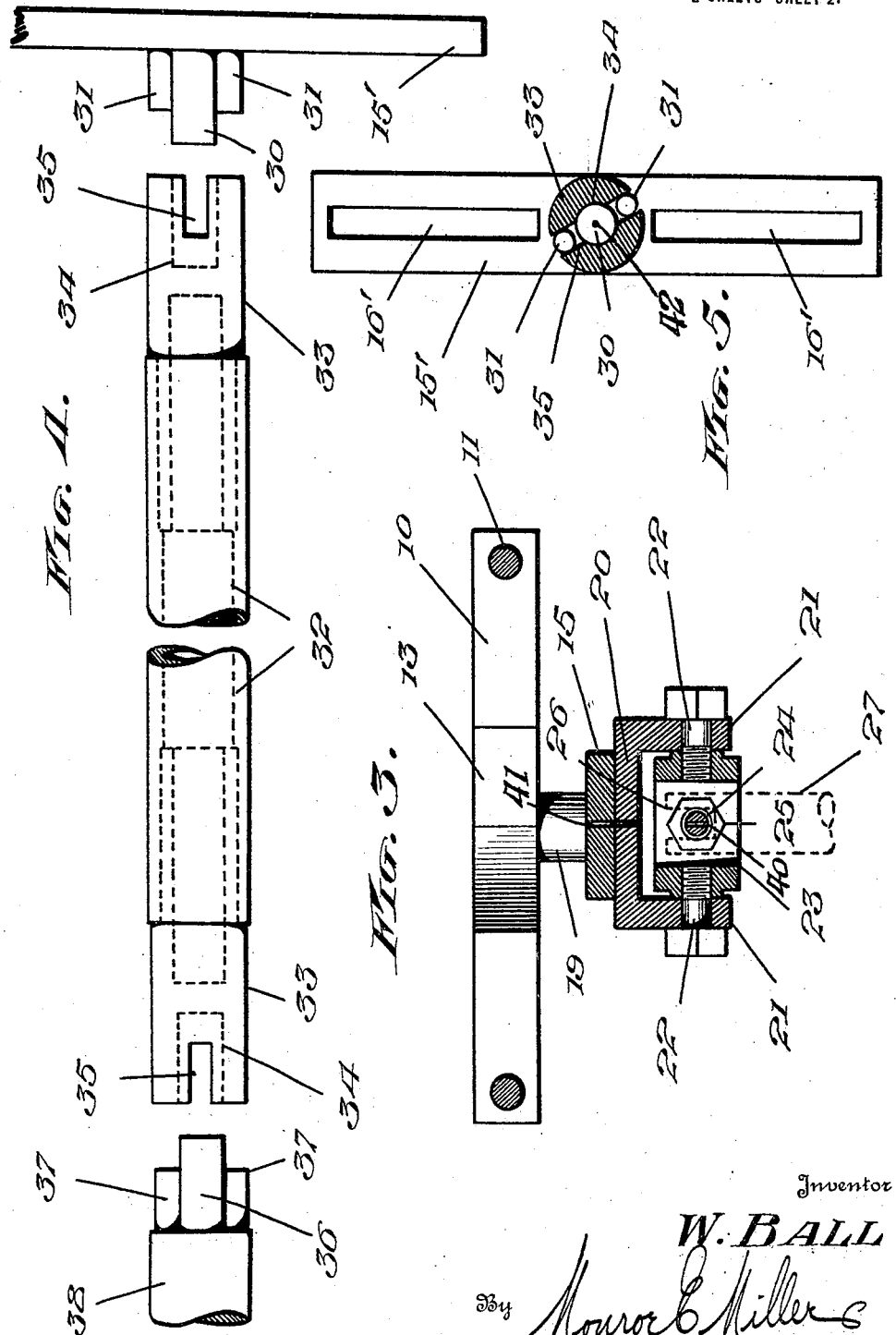

WALTER BALL, OF HUBBARD, OHIO.

UNIVERSAL GENERATOR COUPLING.

1,413,375.                     Specification of Letters Patent.        Patented Apr. 18, 1922.

Application filed March 9, 1921. Serial No. 450,959.

*To all whom it may concern:*

Be it known that I, WALTER BALL, a citizen of the United States, residing at Hubbard, in the county of Trumbull and State of Ohio, have invented certain new and useful Improvements in Universal Generator Couplings, of which the following is a specification, reference being had therein to the accompanying drawing.

The present invention relates generally to shaft couplings, and aims to provide a novel and improved device for coupling the armatures of various types of electrical generators, or other parts to be rotated, with a driving shaft.

The present device is especially useful for testing automobile generators, although it can be used for various other purposes for which it is suited, and has for an object the provision of a coupling having novel means whereby it can accommodate various generators and other devices, which may have gears, sprockets, disks, couplings, or the like, on the ends of the armature shafts, or the bare shafts, thereby requiring a wide range of adjustment to enable a single coupling device to be used, and for which the present coupling is designed.

A further object of the invention is the provision of a coupling having novel yet simple means to be clamped on the shafts, gears, sprockets, or other similar members, of different diameters, and also having means for centering the extension drive shaft to aline the end thereof with the armature shaft, or the like, to which the coupling is applied.

A still further object is the provision of novel means for the connection of the extension drive shaft with the coupling.

It is also an object of the invention to provide such a device which is simple in construction, and which can be readily and quickly applied, so as to save time and work, as well as having a wide range of application to different forms of generator armatures, and other rotary members, as well as eliminating the necessity for the alinement of the generator with the drive shaft.

With the foregoing and other objects in view, which will be apparent as the description proceeds, the invention resides in the construction and arrangement of parts hereinafter described and claimed, it being understood that changes can be made within the scope of what is claimed, without departing from the spirit of the invention.

The invention is illustrated in the accompanying drawings, wherein:—

Figure 1 is a side elevation of the coupling device, portions being broken away and shown in section.

Fig. 2 is a front view of said device.

Fig. 3 is a section on the line 3—3 of Fig. 1.

Fig. 4 is an elevation showing a modification using a flexible extension drive shaft, with the parts separated.

Fig. 5 is a front view of a modified form of centering bar as shown in Fig. 4, showing the coupling member of the shaft in cross section.

The coupling device includes a clamp having the parallel elongated bars or jaws 10, the end portions of which are slidable on the parallel rods 11 arranged at right angles with said bars, and wing nuts 12 are screw-threaded on the terminals of said rods to bear against the bars 10 for moving said bars toward one another. The bars 10 are guided for parallel movement toward and away from one another by the rods 11, and the adjacent faces of the bars 10 have angular confronting recesses 13, the sides of which are arranged at obtuse angles with one another, whereby the bars or jaws 10 can be clamped on objects 14 of different diameters, which may be armature shafts, gears, sprockets, or the like, it being noted that the bars 10 can be moved close together and a considerable distance apart for a wide range of adjustment to take in practically all driving members of automobile generators.

A centering bar 15 extends across the bars 10 in front thereof and at right angles therewith parallel with the rods 7 and has longitudinal slots 16 receiving forwardly-projecting studs 17 carried by the bars 10 midway between the rods 11, where the recesses 15 are located, and nuts 18 are threaded on said studs to clamp the bar 15 against spacers 19 disposed on said studs between the bars 10 and 15, thereby spacing the bar 15 from the member 14 on which the bars 10 are clamped. The bar 15 has shaft-attaching means between its ends, which can be centered with the armature shaft or member 14, by loosening the nuts 18 and sliding the bar 15 longitudinally.

The shaft-attaching means of the bar 15 includes a bracket 20 riveted or otherwise secured to the bar 15 between the ends thereof and arranged transversely across the front side of said bar. The bracket 20 has opposite forwardly-projecting arms 21 through which trunnion or pivot screws 22 are engaged loosely to screw into a square stirrup 23 disposed between said arms 21, whereby to permit said stirrup to swing or oscillate about the axis of said screws 22. A pin 24 located between and at right angles with the screws 22 has its terminals extending through opposite portions of the stirrup 23, and said pin is secured in place by means of nuts 25 threaded thereon and bearing against the opposite portions of the stirrup within the same.

This shaft connecting means is used for receiving the bifurcated or slotted end 26 of a rigid extension drive shaft 27, the opposite end of which is connected by a universal or flexible joint 28 with the drive shaft 29 of the testing outfit. The slotted end 26 of the shaft 27 in fitting astride the pin 24 provides a universal or flexible joint of the shaft 27 with the bar 15. Thus, the shaft 27 in fitting snugly between the nuts 25 can oscillate about the axis of the pin 24, and, the stirrup 23 can oscillate with said shaft in another direction at right angles to the plane of oscillation aforesaid. In this manner, the shaft 27 can oscillate or vibrate about the transverse axes of the pin 24 and screws 22, which are arranged at right angles with one another, and, in connection with the flexible joint 28, will enable the member 14 to be driven even though it is not in strict alinement with the drive shaft 29.

The clamp is readily applied to the member 14 of the generator to be tested, the nuts 12 being unscrewed so that the bars 10 can be separated sufficiently to pass over said member 14. The nuts 12 are then tightened to clamp the bars 10 on said member 14, and the bar 15 is then adjusted longitudinally when the nuts 18 are loosened, to center the shaft-connecting means with the member 14, so that the end of the shaft 27 which is slipped into the stirrup 23 on the pin 24 will run true with the armature shaft or other member which is driven. The device is thus quickly applied, with a saving in time and work, and is adjustable for members 14 of different diameters from the smallest to the largest within practical limits.

In Figs. 4 and 5, a modified form of shaft connecting means is shown, including a centering bar 15' to be used interchangeably with the bar 15, the bar 15' having slots 16' to receive the studs 17. Thus, by removing the bar 15, the bar 15' can be used. The bar 15' has a forwardly projecting centering pin 30 and driving pins 31 at opposite sides thereof. This type of centering bar is used with a flexible extension drive shaft 32 having the similar coupling members 33 at the opposite ends. Said coupling members have the central sockets or recesses 34 in the ends thereof, and diametrical slots 35. The end of the drive shaft 38 also has a centering pin 36 and opposite drive pins 37 similar to those carried by the bar 15'. The coupling members 33 can therefore be slipped on the pins 30 and 36, which enter the sockets 34, and the pins 31 and 37 enter the slots 35. Thus, the pins 30 and 36 center the coupling members 33, while the pins 31 and 37 transmit the torque from the shaft 38 to the extension shaft 32 and from such shaft 32 to the bar 15'. With the flexible shaft 32, the armature or other member to be driven can be considerably out of alinement with or at an angle with the drive shaft 38. Either of the bars 15 and 15' can therefore be used on the clamp of the coupling device, according to whether the rigid extension shaft 27 or the flexible driving shaft 38 is used.

In order to readily center the shaft attaching means, the pin 24 is provided with a central hole 40 and the bracket 20 and bar 15 have a central alining hole 41, and a wire can be inserted through the holes 40 and 41 to engage in the center hole of the armature shaft. Similarly, the pin 30 of the bar 15' can have central hole 42 for the insertion of a wire or stem for convenience in centering the bar 15'.

Having thus described the invention, what is claimed as new is:—

1. A coupling device comprising an adjustable clamp to engage generator armatures and other members of different diameters, means for the connection of a shaft, and an adjustable connection between said means and clamp for centering the shaft with respect to a member on which the clamp is mounted and for retaining the parts in such adjustment.

2. A coupling device comprising a clamp having jaws adjustable toward and away from one another for engaging armatures and other members of different diameters, and a member carried by the clamp for adjustment in directions similar to the directions of adjustment of said jaws and provided with shaft connecting means to be centered with respect to such member on which the clamp is mounted.

3. A coupling device comprising a clamp having a pair of jaws adjustable toward and away from one another, and a centering bar disposed at right angles with said jaws and adjustably connected thereto for longitudinal adjustment, said bar having shaft connecting means to be centered by the adjustment of said bar with respect to a member on which the clamp is mounted.

4. A coupling device comprising a clamp having a pair of jaws adjustable toward and away from one another, a centering bar extending at right angles across said jaws and adjustable longitudinally of itself, means for clamping said bar to said jaws, and shaft connecting means carried by said bar to be centered by the adjustment of said bar with respect to a member on which the clamp is mounted.

5. A coupling device comprising a clamp having a pair of jaws adjustable toward and away from one another, studs projecting from said jaws, a centering bar slidable longitudinally of itself on said studs and having shaft connecting means between its ends to be centered with respect to a member on which the clamp is mounted, and means on said studs for clamping said bar thereon.

6. A coupling device comprising parallel rods, parallel jaws at right angles therewith having their end portions slidable on said rods for the movement of the jaws towards and away from one another for engaging armatures and members of different diameters, means on said rods for adjusting the jaws, and adjustable shaft connecting means connected to said jaws and adjustable to center the shaft with the member on which the jaws are mounted.

7. A coupling device comprising parallel rods, parallel jaws at right angles with said rods having their end portions slidably mounted on said rods, for guiding the jaws for movement toward and away from one another, said jaws having confronting angular recesses between their ends for engaging members of different diameters, means on said rods for moving said jaws toward one another and to clamp said members, studs projecting from said jaws adjacent to said recesses, a centering bar carried by said studs for longitudinal sliding movement at right angles with said jaws, means for clamping said bar to said studs, and shaft connecting means carried by said bar between the ends thereof to be centered with respect to a member on which said jaws are clamped.

8. A coupling device comprising a clamp, a centering bar carried by said clamp, a pin for the engagement of the slotted end of a shaft, and means for mounting said pin from said bar for oscillatory movement about an axis at right angles with the axis of said pin.

9. A coupling device comprising a clamp, a centering bar carried by said clamp, a stirrup supported from said bar for oscillatory movement to receive the slotted end of a shaft, and a pin carried by said stirrup at right angles with the axis of oscillation of said stirrup for the engagement of the slotted end of a shaft.

10. A coupling device comprising a clamp, a centering bar carried thereby, a bracket carried by said bar, a stirrup pivotally mounted in said bracket to receive the slotted end of a shaft for oscillation about an axis at right angles with the shaft, and a pin carried by said stirrup for the engagement of said end of said shaft and arranged at right angles with said axis.

In testimony whereof I hereunto affix my signature.

WALTER BALL.